US009944865B2

(12) United States Patent
Ide et al.

(10) Patent No.: US 9,944,865 B2
(45) Date of Patent: Apr. 17, 2018

(54) DEWAXING CATALYST WITH IMPROVED AROMATIC SATURATION ACTIVITY

(71) Applicant: ExxonMobil Research and Engineering Company, Annandale, NJ (US)

(72) Inventors: Matthew S. Ide, Hillsborough, NJ (US); Stephen J. McCarthy, Center Valley, PA (US); Gary P. Schleicher, Milford, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 0 days.

(21) Appl. No.: 15/381,549

(22) Filed: Dec. 16, 2016

(65) Prior Publication Data

US 2017/0183583 A1 Jun. 29, 2017

Related U.S. Application Data

(60) Provisional application No. 62/271,468, filed on Dec. 28, 2015.

(51) Int. Cl.
| | |
|---|---|
| C10G 69/00 | (2006.01) |
| B01J 29/74 | (2006.01) |
| C10G 45/64 | (2006.01) |
| C10G 47/18 | (2006.01) |

(52) U.S. Cl.
CPC .......... *C10G 69/00* (2013.01); *B01J 29/7461* (2013.01); *C10G 45/64* (2013.01); *C10G 47/18* (2013.01); *C10G 2400/10* (2013.01)

(58) Field of Classification Search
CPC ........ C10G 69/00; C10G 47/18; C10G 45/64; C10G 2400/10; B01J 29/7461
See application file for complete search history.

(56) References Cited

U.S. PATENT DOCUMENTS

| | | | |
|---|---|---|---|
| 3,354,078 A | 11/1967 | Miale et al. | |
| 4,744,884 A * | 5/1988 | Moorehead | C10G 45/62 208/111.35 |
| 5,384,038 A | 1/1995 | Galperin | |
| 5,951,848 A | 9/1999 | Baker, Jr. et al. | |
| 6,136,181 A | 10/2000 | Ziemer | |
| 8,298,403 B2 | 10/2012 | Elia et al. | |
| 8,425,762 B2 | 4/2013 | McCarthy et al. | |
| 8,431,014 B2 | 4/2013 | Krishna et al. | |
| 8,545,694 B2 | 10/2013 | McCarthy et al. | |
| 8,546,286 B2 | 10/2013 | McCarthy et al. | |

(Continued)

OTHER PUBLICATIONS

The International Search Report and Written Opinion of PCT/US2016/067166 dated Mar. 24, 2017.

(Continued)

*Primary Examiner* — Randy Boyer
*Assistant Examiner* — Juan C Valencia
(74) *Attorney, Agent, or Firm* — Scott F. Yarnell (57) ABSTRACT

Methods are provided for dewaxing distillate feeds using a dewaxing catalyst with improved aromatic saturation activity. The dewaxing can be performed using a catalyst including a zeolitic molecular sieve with a beneficial ratio of zeolitic molecular sieve to binder and/or using a catalyst including a zeolitic molecular sieve with a reduced ratio of silica to alumina.

14 Claims, 1 Drawing Sheet

(56) References Cited

U.S. PATENT DOCUMENTS

| | | |
|---|---|---|
| 8,840,779 B2 | 9/2014 | McCarthy et al. |
| 2006/0070916 A1 | 4/2006 | McCarthy et al. |
| 2006/0211902 A1 | 9/2006 | Xiao et al. |
| 2006/0229192 A1 | 10/2006 | McCarthy et al. |
| 2009/0261015 A1* | 10/2009 | Joseck .................. C10M 177/00 208/27 |
| 2010/0187156 A1 | 7/2010 | Prentice et al. |
| 2011/0079540 A1 | 4/2011 | Krishna et al. |
| 2011/0180453 A1 | 7/2011 | Elia et al. |
| 2011/0192766 A1 | 8/2011 | McCarthy et al. |
| 2012/0000818 A1* | 1/2012 | Dougherty ............. C10G 45/44 208/97 |
| 2012/0308439 A1* | 12/2012 | Chen .................... B01D 53/945 422/180 |
| 2013/0261364 A1 | 10/2013 | Ercan et al. |
| 2013/0264246 A1 | 10/2013 | Holtzer et al. |
| 2014/0274664 A1 | 9/2014 | Weigel et al. |
| 2015/0175911 A1 | 6/2015 | Shih et al. |

OTHER PUBLICATIONS

The International Search Report and Written Opinion of PCT/US2016/067175 dated Apr. 12, 2017.

Miale, J.N. et al., "Catalysis by Crystalline Aluminosilicates", Journal of Catalysis, 1966, vol. 6, pp. 278-287.

Mokaya, Robert et al., "Acidity and catalytic activity of the mesoporous aluminosilicate molecular sieve MCM-41", Catalysis Letters, 1996, vol. 37, pp. 113-120.

Molinari, E. et al., "A Kinetic Study of the Slow Rise and Decay of the Photoconductivity in Zinc Oxide", Journal of Catalysis, 1965, vol. 4, p. 415-429.

Olson, D.H. et al., "Chemical and Physical Properties of the ZSM-5 Substitutional Series", Journal of Catalysis, 1980, vol. 61, pp. 390-396.

Park, Kwang-Cheon et al., "Characteristics of Al-MCM-41 supported Pt catalysts: effect of Al distribution in Al-MCM-41 on its catalytic activity in naphthalene hydrogenation", Catalysis Today, 2002, vol. 74, pp. 281-290.

Pawelec, B. et al., "Structural and surface features of PtNi catalysts for reforming of methane with $CO_2$", Applied catalysis A: General, 2007, vol. 323, pp. 188-201.

Roldan, Rafael et al., "Effect of the impregnation order on the nature of metal particles of bi-functional Pt/Pd-supported zeolite Beta materials and on their catalytic activity for the hydroisomerization of alkanes", Journal of Catalysis, 2008, vol. 254, pp. 12-26.

Sakthivel, A. et al., "The influence of aluminium sources on the acidic behaviour as well as on the catalytic activity of mesoporous H-AlMCM-41 molecular sieves", Microporous and Mesoporous Materials, 2003, vol. 65, pp. 177-187.

Wang, Jun et al., "Acid function of Al-MCM-41 supported platinum catalysts in hydrogenation of benzene, toluene and o-xylene", Catalysis Letters, 1998, vol. 55, pp. 157-163.

Turaga, U. et al., "Deep Hydrodesulfurization of Diesel and Jet Fuels Using Mesoporous Molecular Sieve-Supported Co—Mo/MCM-41 Catalysts" ACS Division of Petroleum Chemistry, Inc. Preprints, ACS 222nd National Meeting, 2001, vol. 46, Issue 3, pp. 275-279, Abstract.

* cited by examiner

DEWAXING CATALYST WITH IMPROVED AROMATIC SATURATION ACTIVITY

CROSS-REFERENCE TO RELATED APPLICATIONS

This application claims priority to U.S. Provisional Application No. 62/271,468 filed Dec. 28, 2015, which is herein incorporated by reference in its entirety.

This application is related to a co-pending U.S. application Ser. No. 15/381,570, filed on an even date herewith, (entitled "SEQUENTIAL IMPREGNATION FOR NOBLE METAL ALLOY FORMATION"), which is incorporated herein by reference in its entirety.

FIELD

Methods are provided for impregnation of noble metals on hydroprocessing catalysts.

BACKGROUND

Platinum is a commonly used metal for hydrogenation and dehydrogenation reactions during catalytic processing of hydrocarbonaceous feeds. Although platinum has a lower resistance to poisoning by sulfur, for sufficiently clean feeds platinum can provide a superior level of catalytic activity relative to base metals and/or palladium. In some situations, alloys of platinum and palladium can be used, in an effort to provide activity similar to platinum while retaining some desirable properties of palladium. Conventionally, dispersion of platinum on a catalyst is used as an indicator of whether a suitable distribution of platinum has been achieved on a catalyst.

U.S. Pat. No. 8,840,779 and U.S. Patent Application Publication 2015/0175911 describe dewaxing catalysts and methods for dewaxing of feeds including a lubricant boiling range portion.

SUMMARY

In one aspect, a method of dewaxing a feed is provided. The method includes exposing a feed comprising a lubricant boiling range portion to a dewaxing catalyst under effective dewaxing conditions to form a dewaxed effluent. The feed can have an aromatics content of at least 5 wt % and/or an organic sulfur content of at least 50 wppm. The dewaxing catalyst can include a zeolitic molecular sieve, a mesoporous binder, and at least 0.1 wt % of a Group VIII metal. The dewaxing catalyst can have a ratio of zeolitic molecular sieve to binder of at least about 75:25.

In another aspect, a dewaxing catalyst is provided. The dewaxing catalyst can include a zeolitic molecular sieve having a largest pore channel size corresponding to a 10-member ring, a mesoporous binder, and 0.1 wt % to 2.0 wt % of a Group VIII noble metal. The dewaxing catalyst can have a density of less than 0.52 g/cm$^3$, a ratio of zeolitic molecular sieve to binder of 75:25 to 85:15, or a combination thereof.

DETAILED DESCRIPTION

All numerical values within the detailed description and the claims herein are modified by "about" or "approximately" the indicated value, and take into account experimental error and variations that would be expected by a person having ordinary skill in the art.

In various aspects, methods are provided for forming dewaxing catalysts with improved aromatic saturation activity. In some aspects, the aromatic saturation activity of a dewaxing catalyst can be improved by forming a catalyst with a suitable ratio of molecular sieve to binder. In particular, increasing the molecular sieve content of a catalyst can result in a catalyst with an increased activity per bound catalyst volume. For dewaxing catalysts, dewaxing activity can generally correlate with the weight of zeolite (and/or other molecular sieve) present in a reactor. However, it has been unexpectedly discovered that for a similar weight of dewaxing catalyst, a catalyst with a lower amount of binder and a lower density can have an improved activity per catalyst volume in reaction environments with increased sulfur content. In particular, for catalyst amounts in a catalyst between about 75 wt % and 85 wt %, a dewaxing catalyst can have an unexpectedly high aromatic saturation activity by volume in reaction environments containing 100 wppm or sulfur or more, or 200 wppm or more. This unexpectedly high aromatic saturation activity can be greater than the activity for dewaxing catalysts with still higher molecular sieve content.

In other aspects, the aromatic saturation activity of a catalyst can be improved by forming a catalyst using a molecular sieve with a reduced ratio of silica to alumina. Without being bound by any particular theory, it is believed that reducing the ratio of silica to alumina in a molecular sieve can provide increased acidity for a catalyst including the molecular sieve. The increased acidity is believed to contribute to increased aromatic saturation activity and/or increased dewaxing activity.

An example of a suitable molecular sieve is a zeolitic molecular sieve with the framework structure of ZSM-48. Other zeolitic molecular sieves can also potentially be used, such as other molecular sieves with a framework structure with a largest pore channel size corresponding to a 10-member ring. Examples of framework structures having a largest pore channel size corresponding to a 10-member ring include molecular sieves of framework structure MRE (ZSM-48), MTT, EUO, AEL, AFO, SFF, STF, or TON. Suitable binders can be mesoporous metal oxide binders, as described in greater detail below.

In this discussion, a "zeolitic" catalyst is defined as a catalyst that includes a framework structure geometry that corresponds to a known framework type. Examples of known frameworks are those frameworks documented in the database of zeolite structures by the International Zeolite Association. A zeolite, which is a type of zeolitic catalyst, can have a framework structure that is substantially composed of silicon, aluminum, and oxygen. For zeolitic catalysts that are not zeolites, other heteroatoms may form part of the framework structure, including structures where silicon and/or aluminum are entirely replaced within the framework structure. Other types of know zeolitic catalysts include, but are not limited to, silicoaluminophosphates (SAPOs); aluminophosphates (AlPOs); and/or other catalysts having a zeolite framework structure where a portion of the silicon and/or aluminum atoms in the framework are replaced with other elements, such elements including but not being limited to titanium, gallium, phosphorous, germanium, tin, boron, antimony, and zinc.

Feedstocks

A wide range of petroleum and chemical feedstocks can be hydroprocessed in reaction systems that include a dewaxing catalyst formed using a plurality of structure directing agents. Suitable feedstocks include whole and reduced petroleum crudes, atmospheric and vacuum residua, propane deasphalted residua, e.g., brightstock, cycle oils, FCC tower bottoms, gas oils, including vacuum gas oils and coker gas oils, light to heavy distillates including raw virgin distillates, hydrocrackates, hydrotreated oils, slack waxes, Fischer-Tropsch waxes, raffinates, and mixtures of these materials.

One way of defining a feedstock is based on the boiling range of the feed. One option for defining a boiling range is to use an initial boiling point for a feed and/or a final boiling point for a feed. Another option, which in some instances may provide a more representative description of a feed, is to characterize a feed based on the amount of the feed that boils at one or more temperatures. For example, a "T5" boiling point for a feed is defined as the temperature at which 5 wt % of the feed will boil off. Similarly, a "T95" boiling point is a temperature at 95 wt % of the feed will boil.

In this discussion, in some aspects a feed can refer to a feed that is exposed to a dewaxing catalyst, such as by passing a feed into a dewaxing stage or contacting the feed with a bed of dewaxing catalyst. In other aspects, a feed can refer to a feed used for lubricant base oil production, where only a portion of the feed will eventually contact a dewaxing catalyst after other (prior) exposure to hydrotreating and/or hydrocracking catalyst beds and/or stages.

Typical feeds include, for example, feeds with an initial boiling point of at least 650° F. (343° C.), or at least 700° F. (371° C.), or at least 750° F. (399° C.). Alternatively, a feed may be characterized using a T5 boiling point, such as a feed with a T5 boiling point of at least 600° F. (316° C.), or at least 650° F. (343° C.), or at least 700° F. (371° C.), or at least 750° F. (399° C.). In some aspects, the final boiling point of the feed can be at least 1100° F. (593° C.), such as at least 1150° F. (621° C.) or at least 1200° F. (649° C.). In other aspects, a feed may be used that does not include a large portion of molecules that would traditional be considered as vacuum distillation bottoms. For example, the feed may correspond to a vacuum gas oil feed that has already been separated from a traditional vacuum bottoms portion. Such feeds include, for example, feeds with a final boiling point of 1150° F. (621° C.), or 1100° F. (593° C.) or less, or 1050° F. (566° C.) or less. Alternatively, a feed may be characterized using a T95 boiling point, such as a feed with a T95 boiling point of 1150° F. (621° C.) or less, or 1100° F. (593° C.) or less, or 1050° F. (566° C.) or less, or 1000° F. (538° C.) or less. An example of a suitable type of feedstock is a wide cut vacuum gas oil (VGO) feed, with a T5 boiling point of at least 700° F. (371° C.) and a T95 boiling point of 1100° F. or less. Optionally, the initial boiling point of such a wide cut VGO feed can be at least 700° F. and/or the final boiling point can be at least 1100° F. It is noted that feeds with still lower initial boiling points and/or T5 boiling points may also be suitable, so long as sufficient higher boiling material is available so that the overall nature of the process is a lubricant base oil production process and/or a fuels hydrocracking process. For example, if the total hydrocracking (liquid) effluent from a hydrocracking process is passed into a dewaxing reactor and/or exposed to a dewaxing catalyst, the feed could include substantial amounts of diesel boiling range compounds and/or naphtha boiling range compounds. This could result in a feed to having a lower T5 boiling point than a typical lubricant boiling range feed, such as a T5 boiling point of at least 350° F. (177° C.), or at least 500° F. (260° C.).

In aspects involving an initial sulfur removal stage prior to dewaxing, the sulfur content of the feed can be at least 300 ppm by weight of sulfur, or at least 1000 wppm, or at least 2000 wppm, or at least 4000 wppm, or at least 10,000 wppm, or at least 20,000 wppm. In other embodiments, including some embodiments where a previously hydrotreated and/or hydrocracked feed is used, the sulfur content can be 2000 wppm or less, or 1000 wppm or less, or 500 wppm or less, or 100 wppm or less.

In various aspects, a feed exposed to a dewaxing catalyst can have a sulfur content (in the form of organic sulfur) of 50 wppm to 1000 wppm, or 50 wppm to 600 wppm, or 100 wppm to 1000 wppm, or 100 wppm to 600 wppm. For example, the sulfur content of the feed exposed to a dewaxing catalyst can have a sulfur content of at least 50 wppm, or at least 100 wppm, or at least 150 wppm, or at least 200 wppm, or at least 250 wppm. As noted above, the "feed" exposed to a dewaxing catalyst can correspond to an effluent from a prior processing stage and/or catalyst bed, such as at least a portion of a hydrotreating effluent, at least a portion of a hydrocracking effluent, or at least a portion of an aromatic saturation effluent.

In this discussion, the distillate boiling range is defined as 350° F. (177° C.) to 700° F. (371° C.). The lubricant boiling range is defined as 700° F. (371° C.) to 1050° F. (538° C.). The naphtha boiling range is defined as 100° F. (37° C.) to 350° F. (177° C.).

Group I basestocks or base oils are defined as base oils with less than 90 wt % saturated molecules and/or at least 0.03 wt % sulfur content. Group I basestocks also have a viscosity index (VI) of at least 80 but less than 120. Group II basestocks or base oils contain at least 90 wt % saturated molecules and less than 0.03 wt % sulfur. Group II basestocks also have a viscosity index of at least 80 but less than 120. Group III basestocks or base oils contain at least 90 wt % saturated molecules and less than 0.03 wt % sulfur, with a viscosity index of at least 120. In addition to the above formal definitions, some Group I basestocks may be referred to as a Group I+ basestock, which corresponds to a Group I basestock with a VI value of 103 to 108. Some Group II basestocks may be referred to as a Group II+ basestock, which corresponds to a Group II basestock with a VI of at least 113. Some Group III basestocks may be referred to as a Group III+ basestock, which corresponds to a Group III basestock with a VI value of at least 130.

Dewaxing Catalyst with Improved Aromatic Saturation Activity

In various aspects, a dewaxing catalyst with improved aromatic saturation activity can be used for processing of a feed including a lubricant boiling range portion, such as a feed having a sulfur content of at least about 100 wppm, or at least 150 wppm, or at least 200 wppm, or at least 250 wppm. Suitable dewaxing catalysts can include molecular sieves such as crystalline aluminosilicates (zeolites) and/or other molecular sieves having a zeolitic framework structure. In an aspect, the molecular sieve can comprise, consist essentially of, or be ZSM-5, ZSM-11, ZSM-22, ZSM-23, ZSM-35, ZSM-48, zeolite Beta, TON (Theta-1), or a combination thereof, for example ZSM-23 and/or ZSM-48, or ZSM-48 and/or zeolite Beta. Optionally, molecular sieves that are selective for dewaxing by isomerization as opposed to cracking can be used, such as ZSM-48, zeolite Beta, ZSM-23, or a combination thereof. Additionally or alternately, the molecular sieve can comprise, consist essentially of, or be a 10-member ring 1-D molecular sieve. Examples include EU-1, ZSM-35 (or ferrierite), ZSM-11, ZSM-57, NU-87, SAPO-11, ZSM-48, ZSM-23, and ZSM-22; for example EU-2, EU-11, ZBM-30, ZSM-48, or ZSM-23; such as ZSM-48. Note that a zeolite having the ZSM-23 structure with a silica to alumina ratio of from 20:1 to 40:1 can sometimes be referred to as SSZ-32. Other molecular sieves that are isostructural with the above materials include NU-10, EU-13, KZ-1, and NU-23.

In various aspects, the dewaxing catalyst can also include a binder for the molecular sieve, such as a mesoporous binder. Examples of suitable binders include, but are not limited to, silica, alumina, silica-alumina, titania, silica-titania, alumina-titania, zirconia, silica-zirconia, titania-zirconia, ceria, tungsten oxide, and combinations thereof, for example alumina, silica, titania, silica-alumina, and combinations thereof.

In some aspects, the additional dewaxing catalyst(s) used in processes according to the disclosure can be catalysts with a low ratio of silica to alumina in the framework structure. For example, for ZSM-48, the ratio of silica to alumina in the zeolite can be less than 200:1, such as less than 110:1, or less than 100:1, or less than 90:1, or less than 75:1. In various embodiments, the ratio of silica to alumina can be from 50:1 to 200:1, such as 60:1 to 160:1, or 70:1 to 100:1.

In other aspects, the ratio of silica to alumina in the ZSM-48 can be a low ratio to allow for enhanced aromatic saturation. In such aspects, the ratio of silica to alumina in ZSM-48 can be 60:1 to 90:1, or 60:1 to 80:1, or 60:1 to 70:1.

In still other aspects, various ratios of silica to alumina may be suitable for enhanced aromatic saturation based on the nature of the framework structure. A lower silica to alumina ratio for a molecular sieve can provide a higher acidity, which is believed to improve aromatic saturation activity. Optionally, a molecular sieve with a lower silica to alumina ratio can correspond to a molecular sieve with a largest pore channel corresponding to a 10-member ring, such as molecular sieves with a framework structure of MRE (ZSM-48), MTT, EUO, AEL, AFO, SFF, STF, or TON. In such aspects, a lower silica to alumina ratio can correspond to a silica to alumina ratio of 30:1 to 40:1, or 40:1 to 50:1, or 50:1 to 60:1, or 60:1 to 70:1.

In various aspects, a dewaxing catalyst can further include a metal hydrogenation component. The metal hydrogenation component can typically be a Group VI and/or a Group VIII metal, such as a Group VIII noble metal. For example, the metal hydrogenation component can be Pt, Pd, or a mixture thereof. In an alternative aspect, the metal hydrogenation component can be a combination of a non-noble Group VIII metal with a Group VI metal. Suitable combinations can include Ni, Co, or Fe with Mo or W, preferably Ni with Mo or W.

The metal hydrogenation component may be added to a catalyst in any convenient manner. One technique for adding the metal hydrogenation component is by incipient wetness. For example, after combining a zeolite (and/or other molecular sieve) and a binder, the combined zeolite and binder can be extruded into catalyst particles. These catalyst particles can then be exposed to a solution containing a suitable metal precursor. Alternatively, metal can be added to the catalyst by ion exchange, where a metal precursor is added to a mixture of molecular sieve (or molecular sieve and binder) prior to extrusion.

The amount of metal in a dewaxing catalyst can be at least 0.1 wt % based on catalyst, or at least 0.15 wt %, or at least 0.2 wt %, or at least 0.25 wt %, or at least 0.3 wt %, or at least 0.5 wt % based on catalyst. The amount of metal in the catalyst can be 20 wt % or less based on catalyst, or 10 wt % or less, or 5 wt % or less, or 2.5 wt % or less, or 1 wt % or less. For aspects where the metal is Pt, Pd, another Group VIII noble metal, or a combination thereof, the amount of metal can be from 0.1 to 5 wt %, preferably from 0.1 to 2 wt %, or 0.25 to 1.8 wt %, or 0.4 to 1.5 wt %. For embodiments where the metal is a combination of a non-noble Group VIII metal with a Group VI metal, the combined amount of metal can be from 0.5 wt % to 20 wt %, or 1 wt % to 15 wt %, or 2.5 wt % to 10 wt %.

In aspects where a dewaxing catalyst includes a binder, the dewaxing catalyst can optionally be formulated using a low surface area binder, a low surface area binder represents a binder with a surface area of 100 m$^2$/g or less, or 80 m$^2$/g or less, or 70 m$^2$/g or less. The amount of zeolite (and/or other molecular sieve) in a catalyst formulated using a binder can be from 30 wt % zeolite to 90 wt % zeolite or even up to about 100 wt % zeolite relative to the combined weight of binder and zeolite.

In some aspects, the ratio of molecular sieve to binder in a catalyst can be selected to provide improved aromatic saturation activity. In such aspects, the ratio of molecular sieve to binder by weight can be at least 75:25, or at least 80:20. Optionally but preferably, the ratio of molecular sieve to binder by weight can be 75:25 to 85:15, or 80:20 to 85:15. Optionally, an increased ratio of molecular sieve to binder can also provide a lower density for the catalyst. In various aspects, a catalyst with a ratio of molecular sieve to binder by weight of at least 75:25 can have a density of 0.52 g/cc or less, or 0.50 g/cc or less, or 0.48 g/cc or less.

A zeolite (and/or other molecular sieve) can be combined with binder in any convenient manner. For example, a bound catalyst can be produced by starting with powders of both the zeolite and binder, combining and mulling the powders with added water to form a mixture, and then extruding the mixture to produce a bound catalyst of a desired size. Extrusion aids can also be used to modify the extrusion flow properties of the zeolite and binder mixture.

Process conditions in a catalytic dewaxing zone can include a temperature of from 200 to 450° C., preferably 270 to 400° C., a hydrogen partial pressure of from 1.8 MPag to 34.6 MPag (250 psig to 5000 psig), preferably 4.8 MPag to 20.7 MPag, and a hydrogen treat gas rate of from 35.6 m$^3$/m$^3$ (200 SCF/B) to 1781 m$^3$/m$^3$ (10,000 scf/B), preferably 178 m$^3$/m$^3$ (1000 SCF/B) to 890.6 m$^3$/m$^3$ (5000 SCF/B). In still other embodiments, the conditions can include temperatures in the range of 600° F. (343° C.) to 815° F. (435° C.), hydrogen partial pressures of from 500 psig to 3000 psig (3.6 MPag-20.7 MPag), and hydrogen treat gas rates of from 213 m$^3$/m$^3$ to 1068 m$^3$/m$^3$ (1200 SCF/B to 6000 SCF/B). These latter conditions may be suitable, for example, if the dewaxing stage is operating under sour conditions. The liquid hourly space velocity (LHSV) can be from 0.2 h$^{-1}$ to 10 h$^{-1}$, such as from 0.5 h$^{-1}$ to 5 and/or from 1 h$^{-1}$ to 4 h$^{-1}$.

Additionally or alternately, the conditions for dewaxing can be selected based on the conditions for a preceeding reaction in the stage, such as hydrocracking conditions or hydrotreating conditions. Such conditions can be further modified using a quench between previous catalyst bed(s) and the bed for the dewaxing catalyst. Instead of operating the dewaxing process at a temperature corresponding to the exit temperature of the prior catalyst bed, a quench can be used to reduce the temperature for the hydrocarbon stream at the beginning of the dewaxing catalyst bed. One option can be to use a quench to have a temperature at the beginning of the dewaxing catalyst bed that is the same as the outlet temperature of the prior catalyst bed. Another option can be to use a quench to have a temperature at the beginning of the dewaxing catalyst bed that is at least 10° F. (6° C.) lower than the prior catalyst bed, or at least 20° F. (11° C.) lower, or at least 30° F. (16° C.) lower, or at least 40° F. (21° C.) lower.

In some aspects, the amount of aromatics in the effluent from a catalytic dewaxing step can be characterized based on a weight percent of aromatics in the effluent. The aromatics content after dewaxing can be dependent on the initial amount of aromatics in the feed, and can generally be less than 50 wt %, or less than 40 wt %, or less than 30 wt %, or less than 20 wt %, or less than 10 wt %, or less than 7.5 wt %, or less than 5 wt %, or less than 3 wt %. In other aspects, the amount of aromatics in the effluent can be characterized relative to the amount of aromatics in the feed to the catalytic dewaxing step. For example, a ratio of aromatics in the effluent from catalytic dewaxing to aromatics in the feed can be 0.6 or less, or 0.5 or less, or 0.4 or less, or 0.3 or less, or 0.2 or less, or 0.15 or less, or 0.1 or less.

Hydrotreatment Conditions

In some aspects, exposing a feed to a dewaxing catalyst can occur as part of an integrated process where an initial feed is exposed to a series of hydroprocessing steps, optionally with one or more intermediate separations at various locations in the process. When one or more intermediate separations are used, only a portion of the initial feed will typically be exposed to some of the process steps. The additional processing steps can include hydrotreating, hydrocracking, and/or aromatic saturation of a feed (or portions of a feed).

Hydrotreatment can typically be used to reduce the sulfur, nitrogen, and aromatic content of a feed. The catalysts used for hydrotreatment can include conventional hydroprocessing catalysts, for example those that comprise at least one Group VIII non-noble metal (Columns 8-10 of IUPAC periodic table), such as Fe, Co, and/or Ni, optionally Co and/or Ni; and at least one Group VI metal (Column 6 of IUPAC periodic table), such as Mo and/or W. Such hydroprocessing catalysts optionally include transition metal sulfides that are impregnated or dispersed on a refractory support or carrier such as alumina and/or silica. The support or carrier itself typically has no significant/measurable catalytic activity. Substantially carrier- or support-free catalysts, commonly referred to as bulk catalysts, generally have higher volumetric activities than their supported counterparts.

The catalysts can either be in bulk form or in supported form. In addition to alumina and/or silica, other suitable support/carrier materials can include, but are not limited to, zeolites, titania, silica-titania, and titania-alumina. Suitable aluminas are porous aluminas such as gamma or eta having average pore sizes from 50 to 200 Å, or 75 to 150 Å; a surface area from 100 to 300 m$^2$/g, or 150 to 250 m$^2$/g; and a pore volume of from 0.25 to 1.0 cm$^3$/g, or 0.35 to 0.8 cm$^3$/g. More generally, any convenient size, shape, and/or pore size distribution for a catalyst suitable for hydrotreatment of a distillate (including lubricant base oil) boiling range feed in a conventional manner may be used. It is noted that more than one type of hydroprocessing catalyst can be used in one or multiple reaction vessels.

The at least one Group VIII non-noble metal, in oxide form, can be present in an amount ranging from 2 wt % to 40 wt %, or from 4 wt % to 15 wt %. The at least one Group VI metal, in oxide form, can be present in an amount ranging from 2 wt % to 70 wt %, or for supported catalysts from 6 wt % to 40 wt % or from 10 wt % to 30 wt %. These weight percents are based on the total weight of the catalyst. Suitable metal catalysts can include cobalt/molybdenum (1-10% Co as oxide, 10-40% Mo as oxide), nickel/molybdenum (1-10% Ni as oxide, 10-40% Co as oxide), or nickel/tungsten (1-10% Ni as oxide, 10-40% W as oxide) on alumina, silica, silica-alumina, or titania.

The hydrotreatment is carried out in the presence of hydrogen. A hydrogen stream is, therefore, fed or injected into a vessel or reaction zone or hydroprocessing zone in which the hydroprocessing catalyst is located. Hydrogen, which is contained in a hydrogen "treat gas," is provided to the reaction zone. Treat gas can be either pure hydrogen or a hydrogen-containing gas, which is a gas stream containing hydrogen in an amount that is sufficient for the intended reaction(s), optionally including one or more other gasses (e.g., nitrogen and light hydrocarbons such as methane), and which will not adversely interfere with or affect either the reactions or the products. Impurities, such as $H_2S$ and $NH_3$ are undesirable and would typically be removed from the treat gas before it is conducted to the reactor. In aspects where the treat gas stream introduced into a reaction stage contains components other than hydrogen, the treat gas can contain at least 50 vol. %, or at least 75 vol. % hydrogen, or at least 90 vol % hydrogen, or at least 95 vol % hydrogen, or at least 99 vol % hydrogen.

Hydrogen can be supplied at a rate of from 100 SCF/B (standard cubic feet of hydrogen per barrel of feed) (17 Nm$^3$/m$^3$) to 1500 SCF/B (253 Nm$^3$/m$^3$). Preferably, the hydrogen is provided in a range of from 200 SCF/B (34 Nm$^3$/m$^3$) to 1200 SCF/B (202 Nm$^3$/m$^3$). Hydrogen can be supplied co-currently with the input feed to the hydrotreatment reactor and/or reaction zone or separately via a separate gas conduit to the hydrotreatment zone.

Hydrotreating conditions can include temperatures of 200° C. to 450° C., or 315° C. to 425° C.; pressures of 250 psig (1.8 MPag) to 5000 psig (34.6 MPag) or 300 psig (2.1 MPag) to 3000 psig (20.7 MPag); liquid hourly space velocities (LHSV) of 0.1 hr$^{-1}$ to 10 hr$^{-1}$; and hydrogen treat rates of 200 scf/B (35.6 m$^3$/m$^3$) to 10,000 scf/B (1781 m$^3$/m$^3$), or 500 (89 m$^3$/m$^3$) to 10,000 scf/B (1781 m$^3$/m$^3$).

Hydrocracking Conditions

In various aspects, the reaction conditions in the reaction system can be selected to generate a desired level of conversion of a feed. Conversion of the feed can be defined in terms of conversion of molecules that boil above a temperature threshold to molecules below that threshold. The conversion temperature can be any convenient temperature, such as 700° F. (371° C.). In an aspect, the amount of conversion in the stage(s) of the reaction system can be selected to enhance diesel production while achieving a substantial overall yield of fuels. The amount of conversion can correspond to the total conversion of molecules within any stage of the fuels hydrocracker or other reaction system that is used to hydroprocess the lower boiling portion of the feed from the vacuum distillation unit. Suitable amounts of conversion of molecules boiling above 700° F. to molecules boiling below 700° F. include converting at least 25% of the 700° F.+ portion of the feedstock to the stage(s) of the reaction system, or at least 40% of the 700° F.+ portion, or at least 50%, or at least 60%, or at least 70%, or at least 75%. Additionally or alternately, the amount of conversion for the reaction system can be 85% or less, or 80% or less, or 75% or less, or 70% or less, or 60% or less, or 50% or less. Each of the above lower bounds on the amount of conversion is explicitly contemplated in conjunction with each of the above upper bounds. Still larger amounts of conversion may also produce a suitable hydrocracker bottoms for forming lubricant base oils, but such higher conversion amounts will also result in a reduced yield of lubricant base oils. Reducing the amount of conversion can increase the yield of lubricant base oils, but reducing the amount of conversion to below the ranges noted above may result in hydrocracker bottoms that are not suitable for formation of Group II, Group II+, or Group III lubricant base oils.

In order to achieve a desired level of conversion, a reaction system can include at least one hydrocracking catalyst. Hydrocracking catalysts typically contain sulfided base metals on acidic supports, such as amorphous silica alumina, cracking zeolites such as USY, or acidified alumina. Often these acidic supports are mixed or bound with other metal oxides such as alumina, titania or silica. Examples of suitable acidic supports include acidic molecular sieves, such as zeolites or silicoaluminophosphates. One example of suitable zeolite is USY, such as a USY zeolite with cell size of 24.25 Angstroms or less. Additionally or alternately, the catalyst can be a low acidity molecular sieve, such as a USY zeolite with a Si to Al ratio of at least 20, and preferably at least 40 or 50. Zeolite Beta is another example of a potentially suitable hydrocracking catalyst. Non-limiting examples of metals for hydrocracking catalysts include metals or combinations of metals that include at least one Group VIII metal, such as nickel, nickel-cobalt-molybdenum, cobalt-molybdenum, nickel-tungsten, nickel-molybdenum, and/or nickel-molybdenum-tungsten. Additionally or alternately, hydrocracking catalysts with noble metals can also be used. Non-limiting examples of noble metal catalysts include those based on platinum and/or palladium. Support materials which may be used for both the noble and non-noble metal catalysts can comprise a refractory oxide material such as alumina, silica, alumina-silica, kieselguhr, diatomaceous earth, magnesia, zirconia, or combinations thereof, with alumina, silica, alumina-silica being the most common (and preferred, in one embodiment).

In various aspects, the conditions selected for hydrocracking for fuels production and/or lubricant base stock production can depend on the desired level of conversion, the level of contaminants in the input feed to a hydrocracking stage, and potentially other factors. For example, hydrocracking conditions in a first stage (such as a sour stage) and/or a second stage (such as a sweet stage) can be selected to achieve a desired level of conversion in the reaction system. A hydrocracking process in the first stage (or otherwise under sour conditions) can be carried out at temperatures of 550° F. (288° C.) to 840° F. (449° C.), hydrogen partial pressures of from 250 psig to 5000 psig (1.8 MPag to 34.6 MPag), liquid hourly space velocities of from 0.05 h$^{-1}$ to 10 h$^{-1}$, and hydrogen treat gas rates of from 35.6 m$^3$/m$^3$ to 1781 m$^3$/m$^3$ (200 SCF/B to 10,000 SCF/B). In other embodiments, the conditions can include temperatures in the range of 600° F. (343° C.) to 815° F. (435° C.), hydrogen partial pressures of from 500 psig to 3000 psig (3.5 MPag-20.9 MPag), and hydrogen treat gas rates of from 213 m$^3$/m$^3$ to 1068 m$^3$/m$^3$ (1200 SCF/B to 6000 SCF/B). The LHSV relative to only the hydrocracking catalyst can be from 0.25 h$^{-1}$ to 50 h$^{-1}$, such as from 0.5 h$^{-1}$ to 20 h$^{-1}$, and preferably from 1.0 h$^{-1}$ to 4.0 h$^{-1}$.

In some aspects, a portion of the hydrocracking catalyst can be contained in a second reactor stage. In such aspects, a first reaction stage of the hydroprocessing reaction system can include one or more hydrotreating and/or hydrocracking catalysts. The conditions in the first reaction stage can be suitable for reducing the sulfur and/or nitrogen content of the feedstock. A separator can then be used in between the first and second stages of the reaction system to remove gas phase sulfur and nitrogen contaminants. One option for the separator is to simply perform a gas-liquid separation to remove contaminant. Another option is to use a separator such as a flash separator that can perform a separation at a higher temperature. Such a high temperature separator can be used, for example, to separate the feed into a portion boiling below a temperature cut point, such as 350° F. (177° C.) or 400° F. (204° C.), and a portion boiling above the temperature cut point. In this type of separation, the naphtha boiling range portion of the effluent from the first reaction stage can also be removed, thus reducing the volume of effluent that is processed in the second or other subsequent stages. Of course, any low boiling contaminants in the effluent from the first stage would also be separated into the portion boiling below the temperature cut point. If sufficient contaminant removal is performed in the first stage, the second stage can be operated as a "sweet" or low contaminant stage.

Still another option can be to use a separator between the first and second stages of the hydroprocessing reaction system that can also perform at least a partial fractionation of the effluent from the first stage. In this type of aspect, the effluent from the first hydroprocessing stage can be separated into at least a portion boiling below the distillate (such as diesel) fuel range, a portion boiling in the distillate fuel range, and a portion boiling above the distillate fuel range. The distillate fuel range can be defined based on a conventional diesel boiling range, such as having a lower end cut point temperature of at least 350° F. (177° C.) or at least 400° F. (204° C.) to having an upper end cut point temperature of 700° F. (371° C.) or less or 650° F. (343° C.) or less. Optionally, the distillate fuel range can be extended to include additional kerosene, such as by selecting a lower end cut point temperature of at least 300° F. (149° C.).

In aspects where the inter-stage separator is also used to produce a distillate fuel fraction, the portion boiling below the distillate fuel fraction includes, naphtha boiling range molecules, light ends, and contaminants such as H$_2$S. These different products can be separated from each other in any convenient manner. Similarly, one or more distillate fuel fractions can be formed, if desired, from the distillate boiling range fraction. The portion boiling above the distillate fuel range represents the potential lubricant base oils. In such aspects, the portion boiling above the distillate fuel range is subjected to further hydroprocessing in a second hydroprocessing stage.

A hydrocracking process in a second stage (or otherwise under non-sour conditions) can be performed under conditions similar to those used for a first stage hydrocracking process, or the conditions can be different. In an embodiment, the conditions in a second stage can have less severe conditions than a hydrocracking process in a first (sour) stage. The temperature in the hydrocracking process can be 40° F. (22° C.) less than the temperature for a hydrocracking process in the first stage, or 80° F. (44° C.) less, or 120° F. (66° C.) less. The pressure for a hydrocracking process in a second stage can be 100 psig (690 kPa) less than a hydrocracking process in the first stage, or 200 psig (1380 kPa) less, or 300 psig (2070 kPa) less. Additionally or alternately, suitable hydrocracking conditions for a second (non-sour) stage can include, but are not limited to, conditions similar to a first or sour stage. Suitable hydrocracking conditions can include temperatures of 550° F. (288° C.) to 840° F. (449° C.), hydrogen partial pressures of from 250 psig to 5000 psig (1.8 MPag to 34.6 MPag), liquid hourly space velocities of from 0.05 to 10 h$^{-1}$, and hydrogen treat gas rates of from 35.6 m$^3$/m$^3$ to 1781 m$^3$/m$^3$ (200 SCF/B to 10,000 SCF/B). In other embodiments, the conditions can include temperatures in the range of 600° F. (343° C.) to 815° F. (435° C.), hydrogen partial pressures of from 500 psig to 3000 psig (3.5 MPag-20.9 MPag), and hydrogen treat gas rates of from 213 m³/m³ to 1068 m³/m³ (1200 SCF/B to 6000 SCF/B). The liquid hourly space velocity can vary depending on the relative amount of hydrocracking catalyst used versus dewaxing catalyst. Relative to the combined amount of hydrocracking and dewaxing catalyst, the LHSV can be from 0.2 h$^{-1}$ to 10 such as from 0.5 to 5 and/or from 1 h$^{-1}$ to 4 h$^{-1}$. Depending on the relative amount of hydrocracking catalyst and dewaxing catalyst used, the LHSV relative to only the hydrocracking catalyst can be from 0.25 to 50 h$^{-1}$, such as from 0.5 to 20 h$^{-1}$, and preferably from 1.0 to 4.0 h$^{-1}$.

In still another embodiment, the same conditions can be used for hydrotreating and hydrocracking beds or stages, such as using hydrotreating conditions for both or using hydrocracking conditions for both. In yet another embodiment, the pressure for the hydrotreating and hydrocracking beds or stages can be the same.

Processing Conditions—Aromatic Saturation

Aromatic saturation can be performed at various locations within a hydroprocessing reaction system. For example, aromatic saturation can be performed prior to other hydroprocessing steps, after a sequence of hydroprocessing steps, or as an intermediate process in a sequence of hydroprocessing steps.

Suitable aromatic saturation catalysts can correspond to catalysts containing a combination of Pt and Pd, with Pd being added first by sequential impregnation. Some examples of mesoporous support materials for hydrofinishing catalysts can include crystalline materials belonging to the M41S class or family of catalysts. The M41S family of catalysts are mesoporous materials having high silica content. Examples include MCM-41, MCM-48 and MCM-50. A preferred member of this class is MCM-41. Other suitable mesoporous materials can include, but are not limited to, amorphous metal oxide supports such as silica, alumina, silica-aluminas, titania, silica-titania, alumina-titania, zirconia, silica-zirconia, titania-zirconia, ceria, tungsten oxide, and combinations thereof. In some aspects an amorphous support can be composed of alumina. The support materials may also be modified, such as by halogenation, or in particular fluorination. The combined amount of Pt and Pd on the catalyst can be 0.1 wt % to 2.0 wt % based on the weight of the catalyst, such as 0.1 wt % to 1.8 wt %, or 0.1 wt % to 1.5 wt %, or 0.1 wt % to 1.2 wt %, or 0.1 wt % to 0.9 wt %, or 0.3 wt % to 1.8 wt %, or 0.3 wt % to 1.5 wt %, or 0.3 wt % to 1.2 wt %, or 0.3 wt % to 0.9 wt %, or 0.6 wt % to 1.8 wt %, or 0.6 wt % to 1.5 wt %, or 0.6 wt % to 1.2 wt %. The Pt and Pd can be included in any convenient weight ratio, such as a Pt to Pd weight ratio of 0.1 (i.e., 1 part Pt to 10 parts Pd) to 10.0 (i.e., 10 parts Pt to 1 part Pd). For example, the Pt to Pd ratio can be 0.1 to 10.0, or 0.1 to 5.0, or 0.1 to 4.0, or 0.1 to 3.0, or 0.1 to 2.0, or 0.1 to 1.5, or 0.1 to 1.0, or 0.2 to 10.0, or 0.2 to 5.0, or 0.2 to 4.0, or 0.2 to 3.0, or 0.2 to 2.0, or 0.2 to 1.5, or 0.2 to 1.0, or 0.2 to 0.5, or 0.3 to 10.0, or 0.3 to 5.0, or 0.3 to 4.0, or 0.3 to 3.0, or 0.3 to 2.0, or 0.3 to 1.5, or 0.3 to 1.0, or 0.3 to 0.5, or 0.5 to 10.0, or 0.5 to 5.0, or 0.5 to 4.0, or 0.5 to 3.0, or 0.5 to 2.0, or 0.5 to 1.5, or 0.5 to 1.0. In some preferred aspects, the weight ratio of Pt to Pd can be 0.2 to 1.5, or 0.3 to 1.5, or 0.2 to 1.0, or 0.3 to 1.0. Optionally, other metals can also be present on the catalyst.

Aromatic saturation conditions can include temperatures from about 125° C. to about 425° C., preferably about 180° C. to about 280° C., total pressures from about 300 psig (2.1 MPa) to about 3000 psig (20.7 MPa), preferably about 1000 psig (6.9 MPa) to about 2500 psig (17.2 MPa), liquid hourly space velocities from about 0.1 hr$^{-1}$ to about 30 hr$^{-1}$ LHSV, or about 0.5 hr$^{-1}$ to about 30 hr$^{-1}$, or about 0.5 hr$^{-1}$ to about 20 hr$^{-1}$, or about 1.0 hr$^{-1}$ to about 20 hr$^{-1}$, preferably about 1.0 hr$^{-1}$ to about 15 hr$^{-1}$, about 1.5 hr$^{-1}$ to about 15 hr$^{-1}$, or about 1.0 hr$^{-1}$ to about 10 hr$^{-1}$, or about 1.5 hr$^{-1}$ to about 10 hr$^{-1}$, or about 2.0 hr$^{-1}$ to about 20 hr$^{-1}$, or about 2.0 hr$^{-1}$ to about 15 hr$^{-1}$, and treat gas rates of from 35.6 m³/m³ to 1781 m³/m³ (200 SCF/B to 10,000 SCF/B), preferably 213 m³/m³ to about 1068 m³/m³ (1200 SCF/B to 6000 SCF/B) of a hydrogen-containing treat gas. The hydrogen-containing treat gas can contain at least about 80 vol % H$_2$, or at least about 90 vol %, or at least about 95 vol %, or at least about 98 vol %.

The aromatic saturation conditions can be effective for reducing the aromatics content of a feed. In various aspects, a feed can be a hydrocarbonaceous feed that includes at least 50 wt % (or at least 75 wt % or at least 90 wt %) of hydrocarbon compounds and/or hydrocarbon-like compounds that may also include one or more heteroatoms, such as sulfur, oxygen, and/or nitrogen. A feed to an aromatics saturation step (and/or dewaxing and/or hydrocracking) can have an aromatics content of at least 5 wt %, or at least 10 wt %, or at least 15 wt %, or at least 20 wt % or at least 25 wt %, or at least 30 wt %, or at least 40 wt %, or at least 50 wt %, or at least 60 wt %, such as up to 80 wt % or more. The sulfur content can be, for example, 1000 wppm or less, or 5000 wppm or less, or 100 wppm or less, or 50 wppm or less. The boiling range of the feed can be any convenient boiling range, such as a naphtha boiling range feed, a distillate boiling range feed, a gas oil boiling range feed, a still higher boiling range feed, or a combination thereof. In this discussion, the distillate boiling range is defined as 350° F. (177° C.) to 700° F. (371° C.). With regard to other boiling ranges, the gas oil boiling range is defined as 700° F. (371° C.) to 1100° F. (593° C.) and the naphtha boiling range is defined as 100° F. (37° C.) to 350° F. (177° C.). Optionally, at least a portion of the feed can be derived from a biological source.

In some aspects, the amount of aromatics in the effluent from an aromatics saturation step can be characterized based on a weight percent of aromatics in the effluent. The aromatics content after aromatics saturation (and/or dewaxing and/or hydrocracking) can be dependent on the initial amount of aromatics in the feed, and can generally be less than 50 wt %, or less than 40 wt %, or less than 30 wt %, or less than 20 wt %, or less than 10 wt %, or less than 7.5 wt %, or less than 5 wt %, or less than 3 wt %. In other aspects, the amount of aromatics in the effluent can be characterized relative to the amount of aromatics in the feed to the aromatics saturation step. For example, a ratio of aromatics in the effluent from aromatics saturation to aromatics in the feed can be 0.6 or less, or 0.5 or less, or 0.4 or less, or 0.3 or less, or 0.2 or less, or 0.15 or less, or 0.1 or less.

ADDITIONAL EMBODIMENTS

Additionally or alternatively, the present disclosure can include one or more of the following embodiments.

Embodiment 1

A method of dewaxing a feed, comprising: exposing a feed comprising a lubricant boiling range portion, the feed having an aromatics content of at least 5 wt % and an organic sulfur content of at least 50 wppm, to a dewaxing catalyst under effective dewaxing conditions to form a dewaxed effluent, the dewaxing catalyst comprising a zeolitic molecular sieve, a mesoporous binder, and at least 0.1 wt % of a Group VIII metal, the dewaxing catalyst have a ratio of zeolitic molecular sieve to binder of at least 75:25.

Embodiment 2

The method of Embodiment 1, wherein the zeolitic molecular sieve comprises a molecular sieve having a ZSM-48 framework, the molecular sieve having a ZSM-48 framework optionally having a silica to alumina ratio of 70:1 or less, or 65:1 or less.

Embodiment 3

The method of Embodiment 1, wherein the zeolitic molecular sieve comprises a molecular sieve having a largest pore channel size corresponding to a 10-member ring.

Embodiment 4

The method of any of Embodiment 1 or 3, wherein the zeolitic molecular sieve has a silica to alumina ratio of 60:1 to 70:1, or 50:1 to 60:1, or 40:1 to 50:1, or 30:1 to 40:1.

Embodiment 5

The method of any of the above embodiments, wherein the dewaxing catalyst has a ratio of zeolite to binder of 75:25 to 85:15, or 80:20 to 85:15.

Embodiment 6

The method of any of the above embodiments, wherein the dewaxing catalyst comprises 0.1 wt % to 2.0 wt % of a Group VIII noble metal, the Group VIII noble optionally comprising Pt, Pd, or a combination thereof.

Embodiment 7

The method of any of the above embodiments, wherein the mesoporous binder comprises silica, alumina, silica-alumina, titania, silica-titania, alumina-titania, zirconia, silica-zirconia, titania-zirconia, ceria, tungsten oxide, and combinations thereof.

Embodiment 8

The method of any of the above embodiments, wherein catalyst has a density of less than 0.52 g/cm$^3$, or less than 0.50 g/cm$^3$.

Embodiment 9

The method of any of the above embodiments, wherein a) the feed has a sulfur content of at least 100 wppm, or at least 150 wppm or at least 200 wppm, or at least 250 wppm; b) the feed has a sulfur content of 1000 wppm or less; c) the feed has an aromatics content of at least 10 wt %, or at least 20 wt %; or d) a combination thereof.

Embodiment 10

The method of any of the above embodiments, wherein the feed has a T5 boiling point of at least 600° F. (316° C.), or at least 650° F. (343° C.), or at least 700° F. (370° C.); or wherein the feed has a T95 boiling point of 1100° F. (593° C.) or less, or 1050° F. (565° C.) or less, or 1000° F. (538° C.) or less; or a combination thereof.

Embodiment 11

The method of any of the above embodiments, wherein the feed comprising a lubricant boiling range portion comprises a hydrotreated effluent, a hydrocracked effluent, or a combination thereof.

Embodiment 12

A dewaxed effluent formed according to the method of any of the above embodiments.

Embodiment 13

A dewaxing catalyst, comprising a zeolitic molecular sieve having a largest pore channel size corresponding to a 10-member ring, a mesoporous binder, and 0.1 wt % to 2.0 wt % of a Group VIII noble metal, the dewaxing catalyst having a density of less than 0.52 g/cm$^3$, or less than 0.50 g/cm$^3$, and a ratio of zeolitic molecular sieve to binder of 75:25 to 85:15, or at least 80:20.

Embodiment 14

The dewaxing catalyst of Embodiment 13, wherein the zeolite molecular sieve is ZSM-48 having a silica to alumina ratio of 70:1 or less, or 65:1 or less.

Embodiment 15

The dewaxing catalyst of Embodiment 13 or 14, wherein the Group VIII noble metal comprises Pt, Pd, or a combination thereof.

Embodiment 16

The dewaxing catalyst of any of Embodiments 13-15, wherein the mesoporous binder comprises silica, alumina, silica-alumina, titania, silica-titania, alumina-titania, zirconia, silica-zirconia, titania-zirconia, ceria, tungsten oxide, and combinations thereof.

EXAMPLES

Examples 1-7: Variations in Molecular Sieve to Binder Ratio

In Examples 1-7, catalysts were formed by combining ZSM-48 (silica to alumina ratio of ~70:1) with an alumina binder in various weight ratios. The combined ZSM-48 and alumina binder was then extruded to form catalyst particles. The catalyst particles were then impregnated with Pt (0.15 wt %) and Pd (0.45 wt %) as shown in Table 1.

The catalysts in Examples 1-7 were formed according to the following method. A ZSM-48 crystal with a Si:Al$_2$ ratio of approximately 70:1 was mixed with a mesoporous Versal-300 alumina in ratios ranging from 40 wt % to 90 wt % ZSM-48 with 60% to 10% alumina and was mulled and extruded. The ZSM-48 and alumina were charged into the muller containers with the appropriate amount of water to target 50% solids and were mulled for approximately 10 minutes. The mulled material was then extruded through a 1/16" orifice using a hydraulic press to produce cylindrical extrudates. The extrudes were then dried for 16 hours at 250° F. (121° C.) and precalcined in flowing nitrogen at 1000° F. (538° C.) for 3 hours. After extrusion and precalcination, the extrudates were ion exchanged with 1 N ammonium nitrate solution three times to remove sodium remaining from the crystal synthesis and calcined in air at 1000° F. (538° C.) for 6 hours. The platinum and palladium tetraamine metal complexes were then co-impregnated onto the support surface followed by drying the catalyst in still air for 4 hours and calcining in flowing air at 660° F. (~350° C.) for 3 hours to produce well dispersed platinum and palladium oxide. A summary of the catalysts tested are shown in Table 1. Table 1 also shows zeolite surface area, corresponding to surface area due to micropores, as well as mesoporous surface area due to the binder. Table 1 further shows estimated dispersion, or fraction of noble metal surface area, determined by the strong chemisorption of oxygen. During an oxygen chemisorption test, a Langmuir adsorption model is used to identify a distinction between chemisorption and physisorption of oxygen on the metal surface. The amount of oxygen adsorbed by chemisorption is then compared with an expected amount of surface adsorption sites (such as surface metal atoms) to determine a dispersion value.

TABLE 1

Catalyst Description

| Ex. | Catalyst Description (All numbers wt %) | ZSA/MSA ($m^2/g$) | Chem. (O/M) |
|---|---|---|---|
| 1 | 0.15Pt0.45Pd/90% ZSM-48/10% $Al_2O_3$ | 114/116 | 0.64 |
| 2 | 0.15Pt0.45Pd/80% ZSM-48/20% $Al_2O_3$ | 74/182 | 0.73 |
| 3 | 0.15Pt0.45Pd/70% ZSM-48/30% $Al_2O_3$ | 65/179 | 0.79 |
| 4 | 0.15Pt0.45Pd/60% ZSM-48/40% $Al_2O_3$ | 55/205 | 0.75 |
| 5 | 0.15Pt0.45Pd/50% ZSM-48/50% $Al_2O_3$ | 49/228 | 0.71 |
| 6 | 0.15Pt0.45Pd/40% ZSM-48/60% $Al_2O_3$ | 36/244 | 0.71 |
| 7 | 0.15Pt0.45Pd/65% ZSM-48/35% $Al_2O_3$ | 41/193 | 0.65 |

Following catalyst preparation, the performance of the catalysts in Examples 1-7 for aromatic hydrocarbon saturation (hydrogenation) was determined on two different hydrotreated 600 N dewaxed oils. The dewaxed oils were previously hydrotreated to reduce the sulfur content to approximately 70 ppm or approximately 280 ppm. Approximately 0.08 g of catalyst sized to a 50/170 mesh was loaded into a batch reactor. After pressure testing with nitrogen, the catalysts were dried in nitrogen at 150° C. for 2 hours followed by reduction in 250 psig (1.7 MPag) $H_2$ at 300° C. for 2 hours. The reactor was then cooled to room temperature and transferred to a glove box under a blanket of nitrogen. After opening the reactor under a blanket of nitrogen, approximately 3 cc of dewaxed oil was introduced to the batch reactor and the reactor was resealed. The aromatic saturation activity test was then conducted for 12 hours at 250° C. with 900 psig (6.2 MPag) $H_2$.

The total aromatics were measured by UV absorption (mmol $kg^{-1}$). The percentage of total aromatics converted are shown in Table 2 for the 70 wppm sulfur and the 280 wppm sulfur feeds. The aromatic saturation experiments were run in quadruplicate to determine a standard deviation on the conversion and show statistical significance. The two different sulfur content feeds each show the total aromatics converted increased with increasing zeolitic composition from 40 wt % to 90 wt % in the extrudate base. A commercially available catalyst with 65 wt % ZSM-48 is shown for comparison.

TABLE 2

Aromatic Conversion

| Ex. | Catalyst Description (All numbers wt %) | TA Conv. 70 ppm S | TA Conv. 280 ppm S |
|---|---|---|---|
| 1 | 0.15Pt0.45Pd/90% ZSM-48/10% $Al_2O_3$ | 61.4% ± 0.7% | 24.3% ± 0.5% |
| 2 | 0.15Pt0.45Pd/80% ZSM-48/20% $Al_2O_3$ | 63.6% ± 0.2% | 24.5% ± 0.2% |
| 3 | 0.15Pt0.45Pd/70% ZSM-48/30% $Al_2O_3$ | 61.5% ± 0.3% | 21.8% ± 0.4% |
| 4 | 0.15Pt0.45Pd/60% ZSM-48/40% $Al_2O_3$ | 62.2% ± 0.2% | 21.3% ± 0.5% |
| 5 | 0.15Pt0.45Pd/50% ZSM-48/50% $Al_2O_3$ | 59.0% ± 0.5% | 20.1% ± 0.1% |
| 6 | 0.15Pt0.45Pd/40% ZSM-48/60% $Al_2O_3$ | 58.9% ± 0.2% | 18.8% ± 0.6% |
| 7 | 0.15Pt0.45Pd/65% ZSM-48/35% $Al_2O_3$ | 58.0% ± 0.8% | 21.0% ± 0.4% |

Figure 1:
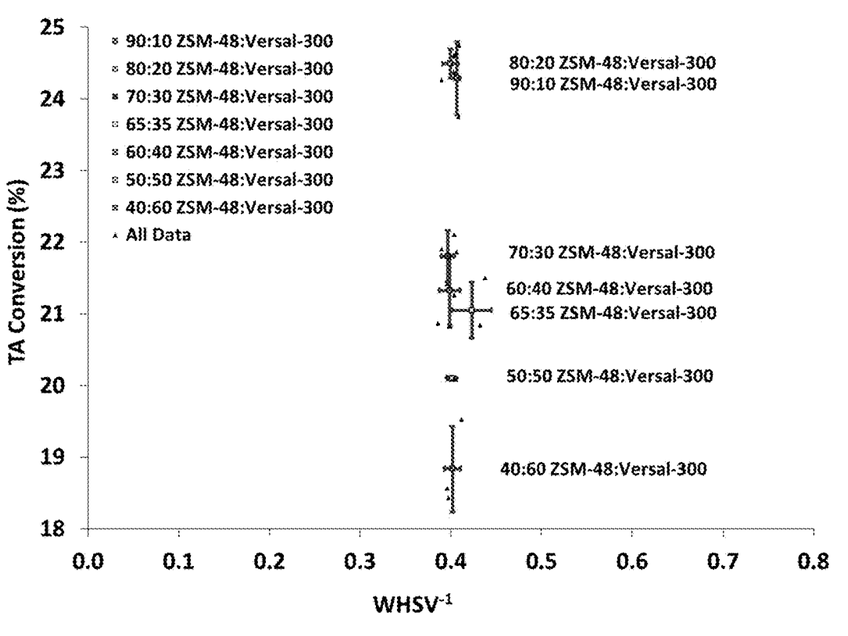
FIG. 1 shows results from performing aromatic saturation using various catalysts on a feed with an elevated sulfur content.

The ZSM-48/alumina catalysts when ranked for aromatic saturation activity using the 280 ppm sulfur feed have the following order accounting for statistical significance: 90/10~80/20>70/30~65/35~60/40>50/50>40/60. This is also shown in FIG. 1. In FIG. 1, the aromatics conversion for the feed containing 280 wppm of sulfur is shown for the catalysts from Examples 1-7, along with the error bars determined from the multiple runs. FIG. 1 visually shows the sharp difference in aromatic saturation activity for the catalysts with higher molecular sieve content.

Without being bound by any particular theory, the increased activity for higher molecular sieve content catalysts may be due in part to the high molecular sieve content catalysts maintaining a high aromatic saturation activity per unit volume even though the density of the catalysts is lower. For example, the catalyst in Example 7 (65/35 ratio of molecular sieve to binder) has a density of ~0.57 $g/cm^3$. By contrast, the catalyst in Example 2 (80/20 ratio) has a density of ~0.48 $g/cm^3$. Thus, although similar weights of catalysts were used, Example 2 corresponded to a larger volume of catalyst. The maintaining of aromatic saturation activity per volume for a lower density catalyst appears to provide improved aromatic saturation performance.

Based on the results shown in Table 2 and FIG. 1, increasing the weight percent of zeolitic content in the catalyst extrudate increased the aromatic saturation capability even though all samples have the same amount of noble metals. While the catalyst ranking for the 70 ppm sulfur content feed is slightly different: 80/20>90/10~70/30~60/40>50/50>40/60, the trend of improved aromatic saturation activity with increasing zeolitic content is evident.

Examples 8-15: Variations in Framework Silica to Alumina Ratio

In Examples 8-15, catalysts were formed by combining ZSM-48 of various silica to alumina ratios with two types of alumina binder.

To form the catalysts in Examples 8-15, ZSM-48 was combined with a binder (either Versal-300 or Catapal-200) in a manner similar to the procedure used for Examples 1-7. After extrusion of the ZSM-48 with alumina, the catalysts were precalcined in $N_2$, exchanged with an ammonium nitrate solution, calcined in air, steamed, impregnated with tetraamine complexes of platinum metal, and finally calcined to produce finely dispersed metal oxides on the catalyst surface.

Following catalyst preparation, the performance of each catalyst for aromatic hydrocarbon saturation (hydrogenation) was determined on hydrotreated 600 N dewaxed oils. The dewaxed oils were previously hydrotreated to reduce the sulfur content to approximately 70 ppm and aromatics to 440 mmol/kg. Approximately 0.08 g of catalyst sized to a 50/170 mesh was loaded into a batch reactor. After pressure testing with nitrogen, the catalysts were dried in nitrogen at 150° C. for 2 hours followed by reduction in 250 psig $H_2$ at 300° C. for 2 hours. The reactor was then cooled to room temperature and transferred to a glove box under a blanket of nitrogen. After opening the reactor under a blanket of nitrogen, approximately 3 cm$^3$ of dewaxed oil was introduced to the batch reactor and the reactor was resealed. The aromatic saturation activity test was then conducted for 12 hours at 250° C. with 900 psig $H_2$.

TABLE 3

Catalyst Description and Aromatics Conversion

| Ex. | Catalyst Description (All numbers wt %) | Total Aromatics Conv. |
|---|---|---|
| 8 | 0.6% Pt on 70:1 (Si/Al$_2$) 65% ZSM-48/35% Versal-300 | 46.3% |
| 9 | 0.6% Pt on 90:1 (Si/Al$_2$) 65% ZSM-48/35% Versal-300 | 40.6% |
| 10 | 0.6% Pt on 180:1 (Si/Al$_2$) 65% ZSM-48/35% Versal-300 | 35.8% |
| 11 | 0.6% Pt on 100% Versal-300 | 27.0% |
| 12 | 0.6% Pt on 65:1 (Si/Al$_2$) 65% ZSM-48/35% Catapal-200 | 44.8% |
| 13 | 0.6% Pt on 70:1 (Si/Al$_2$) 65% ZSM-48/35% Catapal-200 | 42.6% |
| 14 | 0.6% Pt on 90:1 (Si/Al$_2$) 65% ZSM-48/35% Catapal-200 | 36.9% |
| 15 | 0.6% Pt on 100% Catapal-200 | 14.9% |

The total aromatics were measured by UV absorption (mmol kg$^{-1}$). The percentage of total aromatics converted are shown in the table above. Entries 8 through 11 are catalyst formulations that contain Versal-300 alumina, while entries 12 through 15 contain Catapal-200. The Catapal-200 has a larger particle size and lower surface area (66 m$^2$/g) alumina than Versal-300 (350 m$^2$/g). All catalysts contain the same 0.6 wt % Pt metal loading and 65% zeolitic component, but differ in the Si/Al$_2$ ratio of the ZSM-48. The ZSM-48/Versal-300 containing catalysts when ranked for aromatic saturation activity have the following order from greatest to least: 70:1 Si/Al$_2$>90:1 Si/Al$_2$>180:1 Si/Al$_2$>no zeolitic component. The lower the Si/Al$_2$ ratio of the zeolite, for otherwise identical catalyst compositions (entries 8-10), the higher the total aromatic conversion. In addition, the sample that contained no zeolitic component (entry 11), but rather was 100% Versal-300 alumina had a significantly lower aromatic saturation activity than those that contained a zeolitic component.

The same trend was observed for the ZSM-48/Catapal-200 containing catalysts (entries 12-15) where the ranking for aromatic saturation activity from greatest to least was: 65:1 Si/Al$_2$>70:1 Si/Al$_2$>90:1 Si/Al$_2$>no zeolitic component. The increase in aromatic saturation activity with the decrease in ZSM-48 Si/Al$_2$ ratio was consistent regardless of whether the Versal-300 or Catapal-200 alumina binder was used in the catalyst formulation. In addition, the catalyst with no zeolitic component (entry 15) was very poor for aromatic saturation highlighting the importance of ZSM-48 for aromatic saturation activity. Therefore, decreasing the Si/Al$_2$ ratio of the zeolitic content of the catalyst increased the aromatic saturation performance regardless of the alumina used. This benefit is believed to be applicable to other zeolite containing and/or zeolitic dewaxing catalysts and not limited to compositions containing ZSM-48.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The invention claimed is:

1. A method of dewaxing a feed, comprising:
   exposing a feed comprising a lubricant boiling range portion, the feed having an aromatics content of at least 5 wt % and an organic sulfur content of at least 50 wppm, to a dewaxing catalyst under effective dewaxing conditions to form a dewaxed effluent, the dewaxing catalyst comprising a zeolitic molecular sieve, a mesoporous binder, and at least 0.1 wt % of a Group VIII metal, the dewaxing catalyst have a ratio of zeolitic molecular sieve to binder of at least 75:25,
   wherein the dewaxing catalyst has a density of less than 0.52 g/cm$^3$.

2. The method of claim 1, wherein the zeolitic molecular sieve comprises a molecular sieve having a ZSM-48 framework, a molecular sieve having a silica to alumina ratio of 70:1 or less, or a combination thereof.

3. The method of claim 1, wherein the zeolitic molecular sieve comprises a molecular sieve having a largest pore channel size corresponding to a 10-member ring.

4. The method of claim 1, wherein the zeolitic molecular sieve has a silica to alumina ratio of 60:1 to 70:1.

5. The method of claim 1, wherein the zeolitic molecular sieve has a silica to alumina ratio of 50:1 to 60:1.

6. The method of claim 1, wherein the zeolitic molecular sieve has a silica to alumina ratio of 40:1 to 50:1.

7. The method of claim 1, wherein the zeolitic molecular sieve has a silica to alumina ratio of 30:1 to 40:1.

8. The method of claim 1, wherein the dewaxing catalyst has a ratio of zeolite to binder of 75:25 to 85:15.

9. The method of claim 1, wherein the dewaxing catalyst comprises 0.1 wt % to 2.0 wt % of a Group VIII noble metal.

10. The method of claim 9, wherein the Group VIII noble metal comprises Pt, Pd, or a combination thereof.

11. The method of claim 1, wherein the mesoporous binder comprises silica, alumina, silica-alumina, titania, silica-titania, alumina-titania, zirconia, silica-zirconia, titania-zirconia, ceria, tungsten oxide, and combinations thereof.

12. The method of claim 1, wherein the feed has a sulfur content of 100 wppm to 1000 wppm and an aromatics content of at least 10 wt %.

13. The method of claim 1, wherein the feed has a T5 boiling point of at least 600° F. (316° C.), a T95 boiling point of 1100° F. (593° C.) or less; or a combination thereof.

14. The method of claim 1, wherein the feed comprising a lubricant boiling range portion comprises a hydrotreated effluent, a hydrocracked effluent, or a combination thereof.

* * * * *